July 31, 1945.　　C. M. FRIDEN ET AL　　2,380,642
CENTRALIZING MECHANISM
Filed July 1, 1940　　10 Sheets-Sheet 1
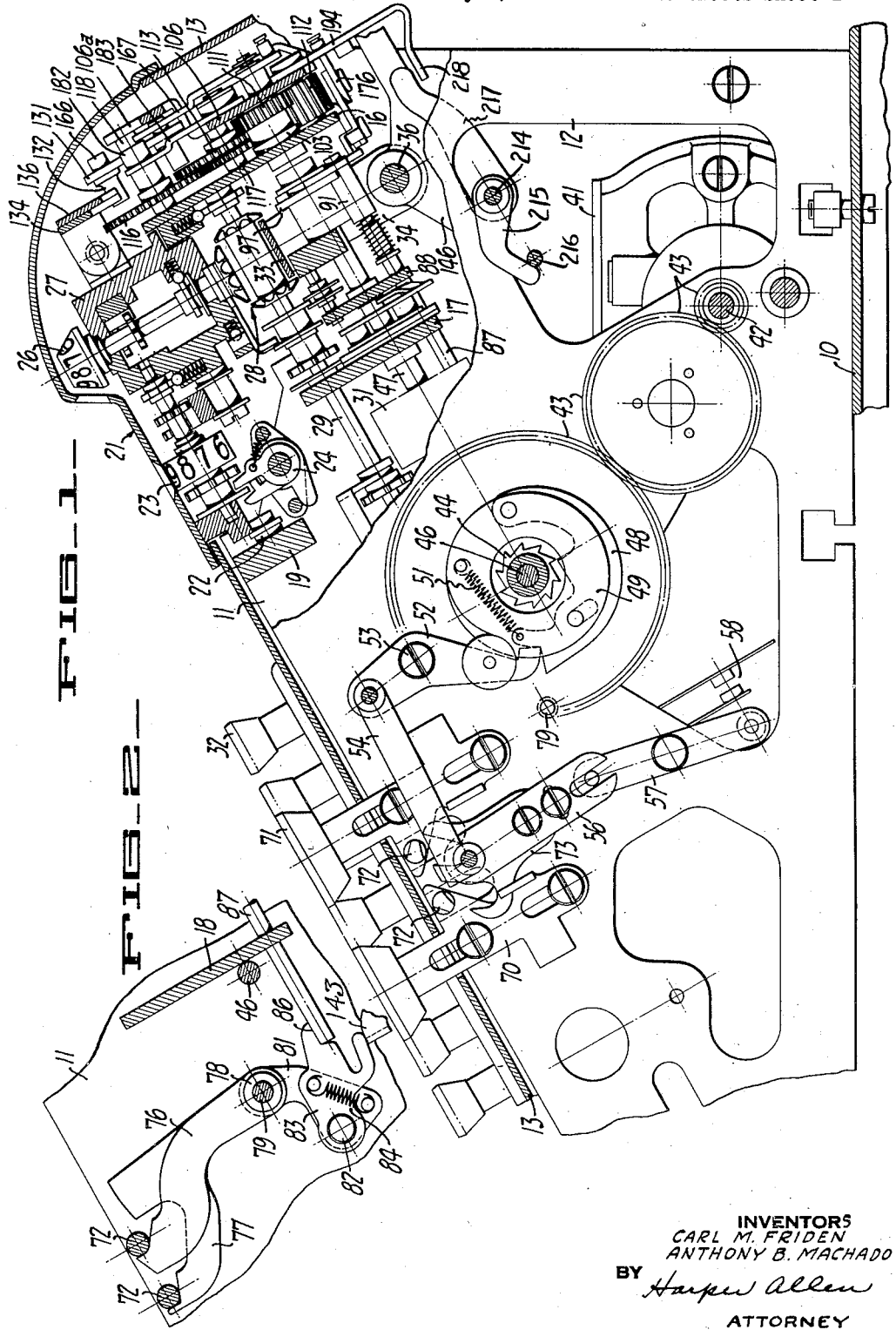
INVENTORS
CARL M. FRIDEN
ANTHONY B. MACHADO
BY Harper Allen
ATTORNEY

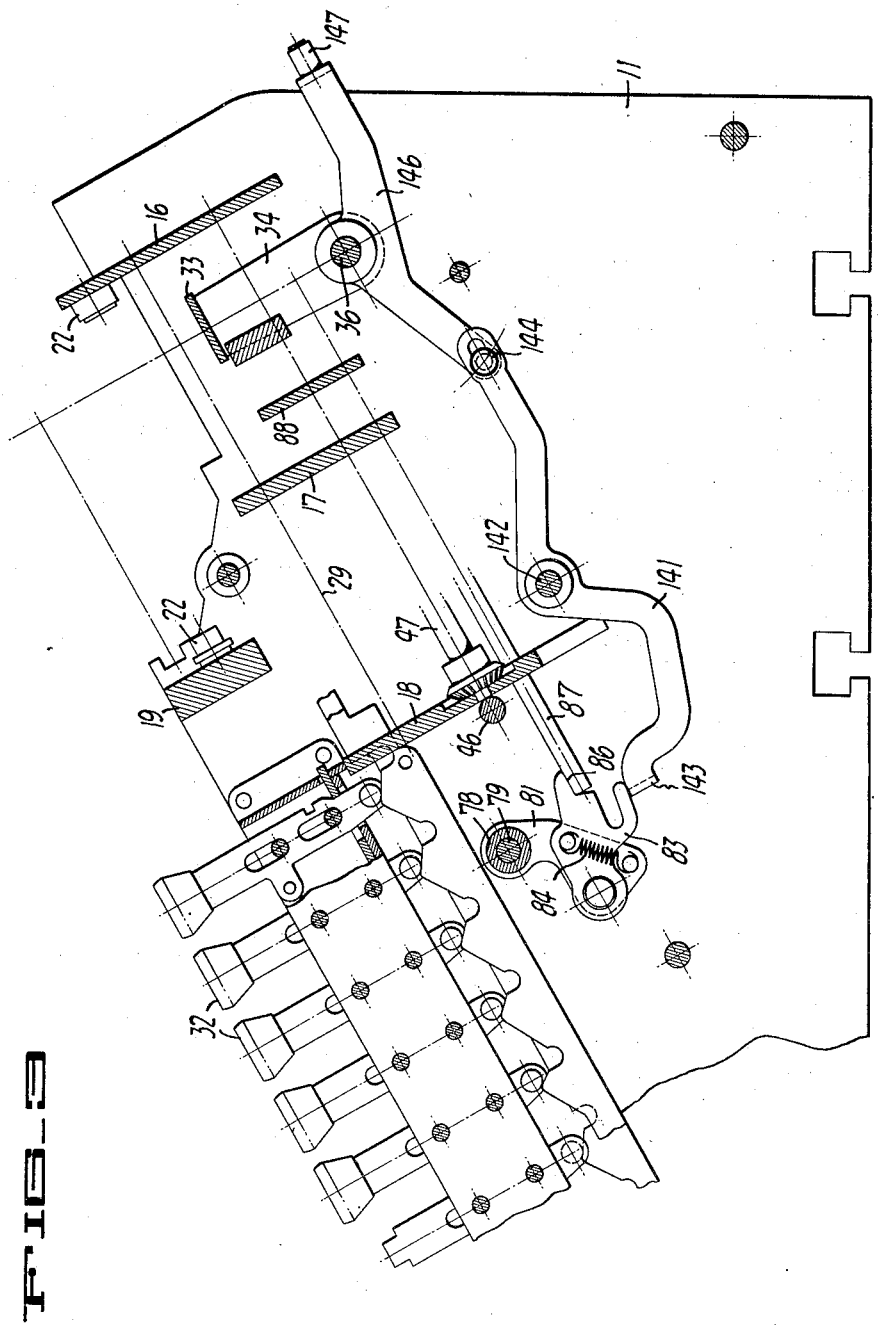

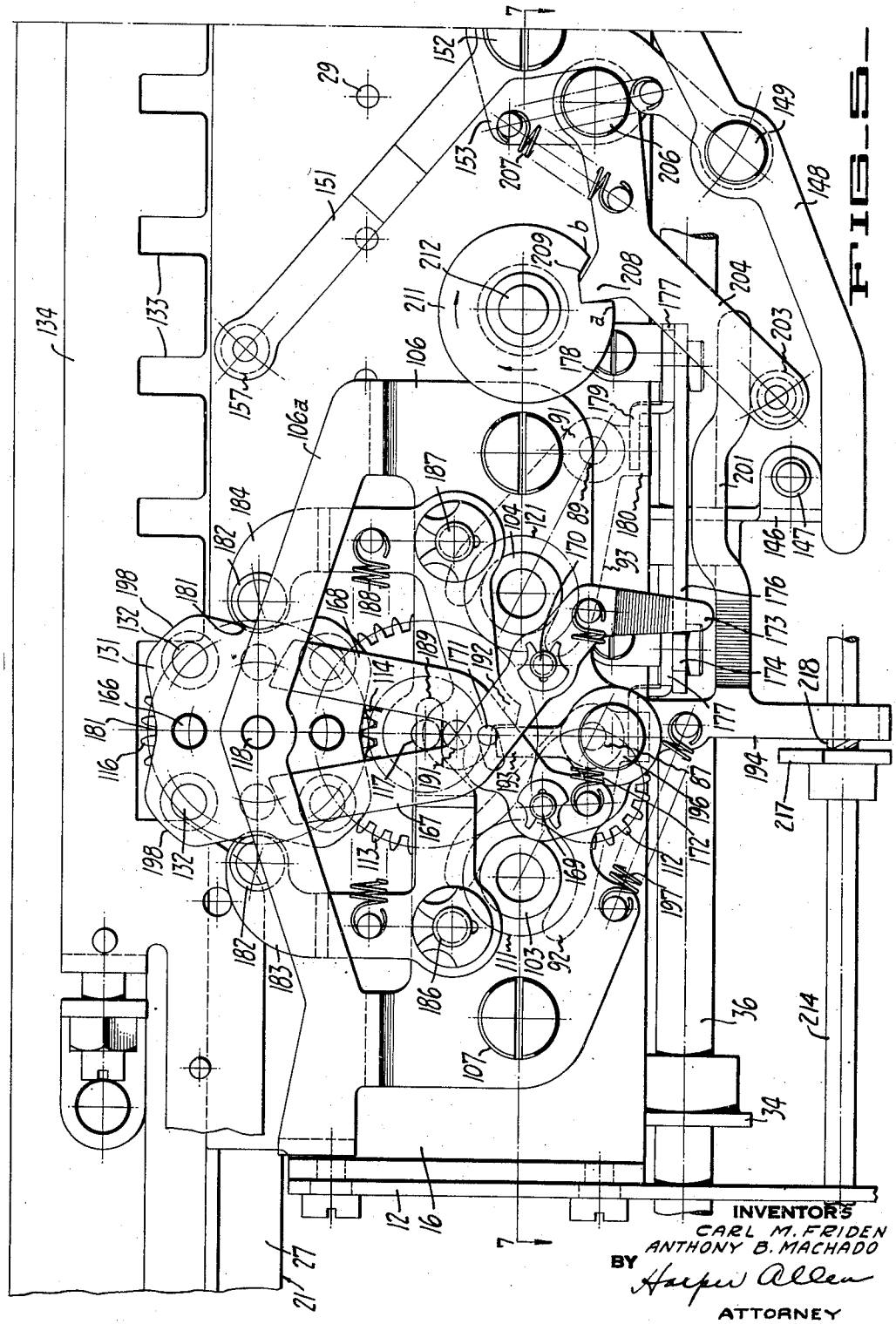

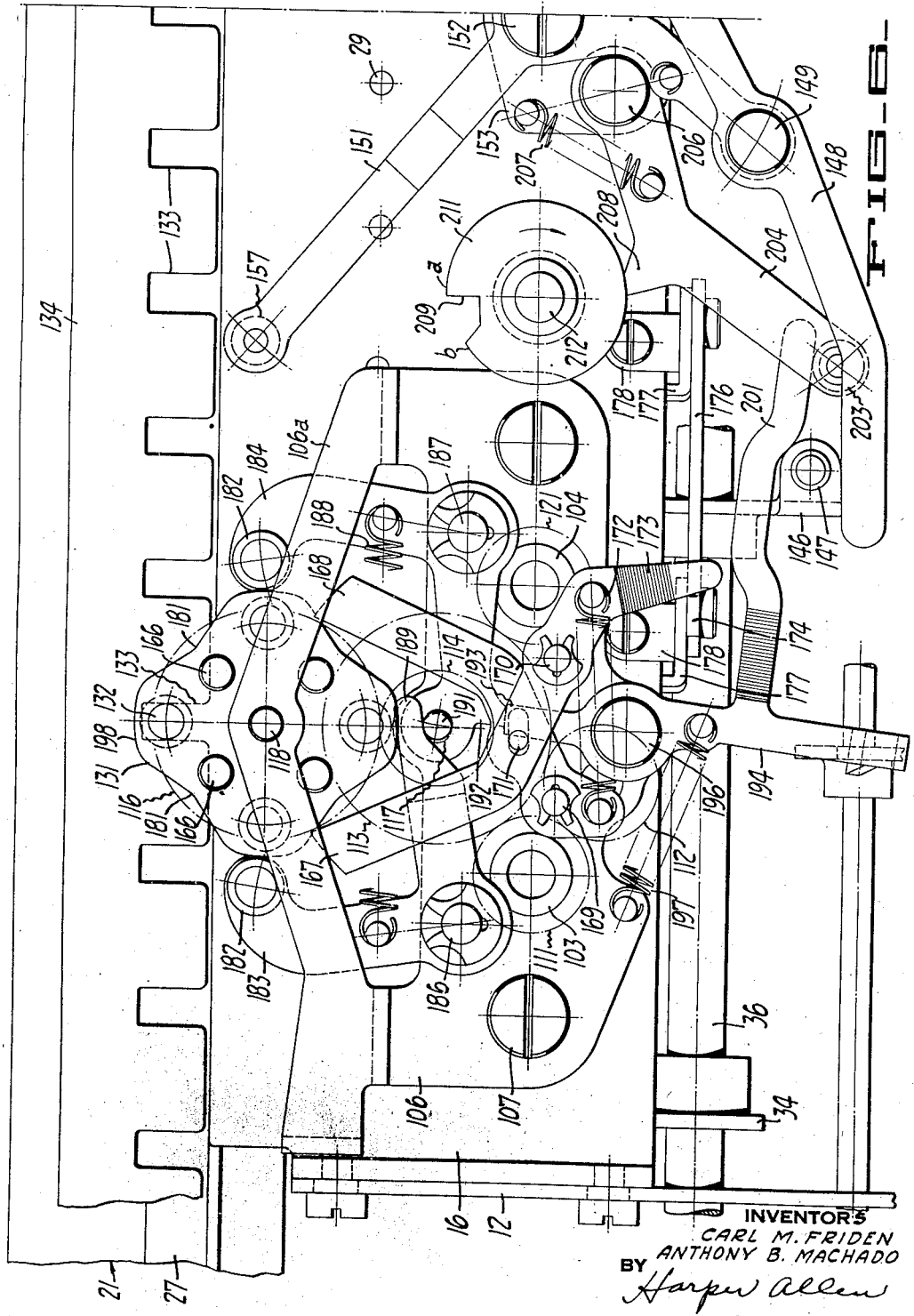

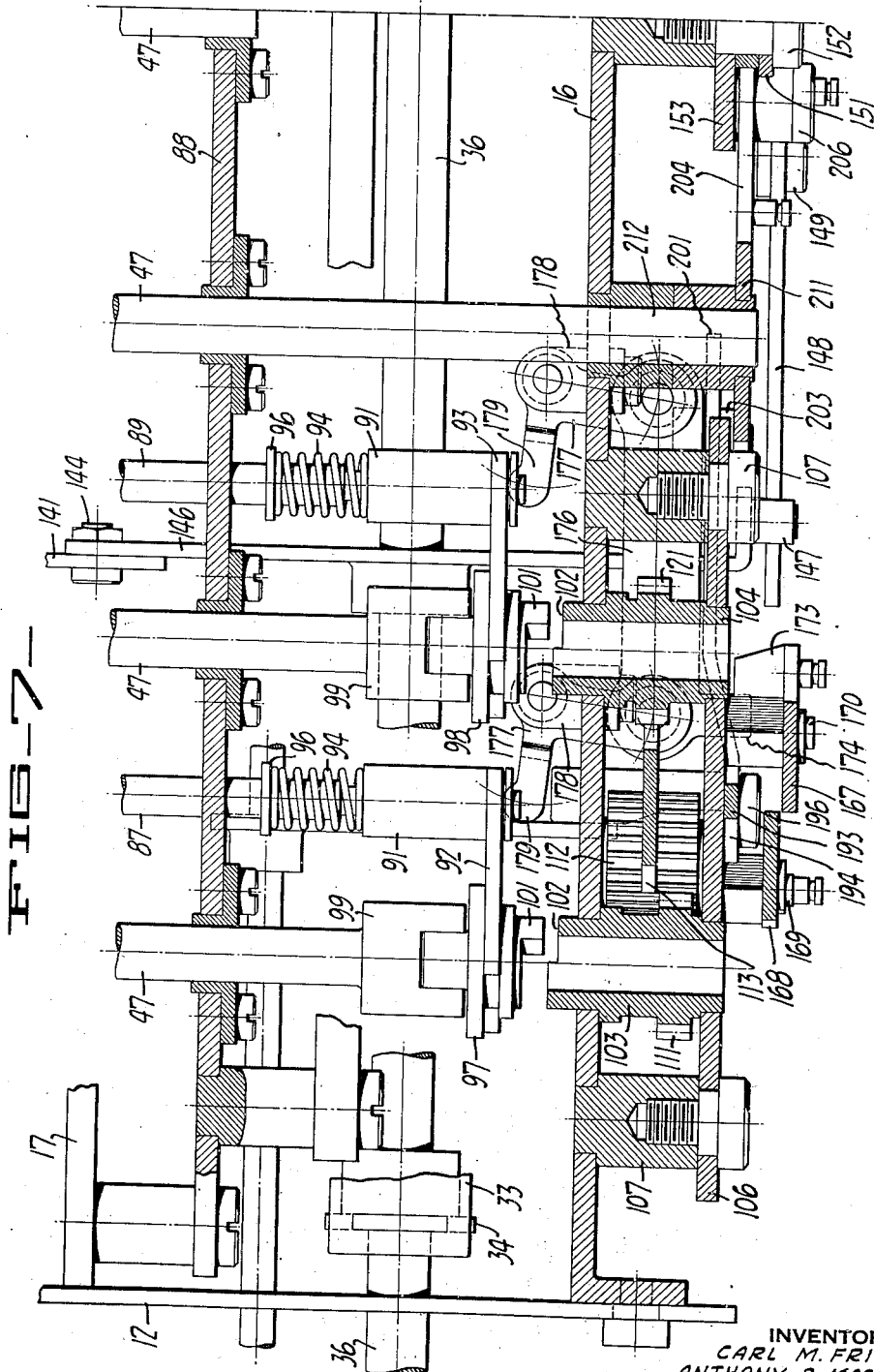

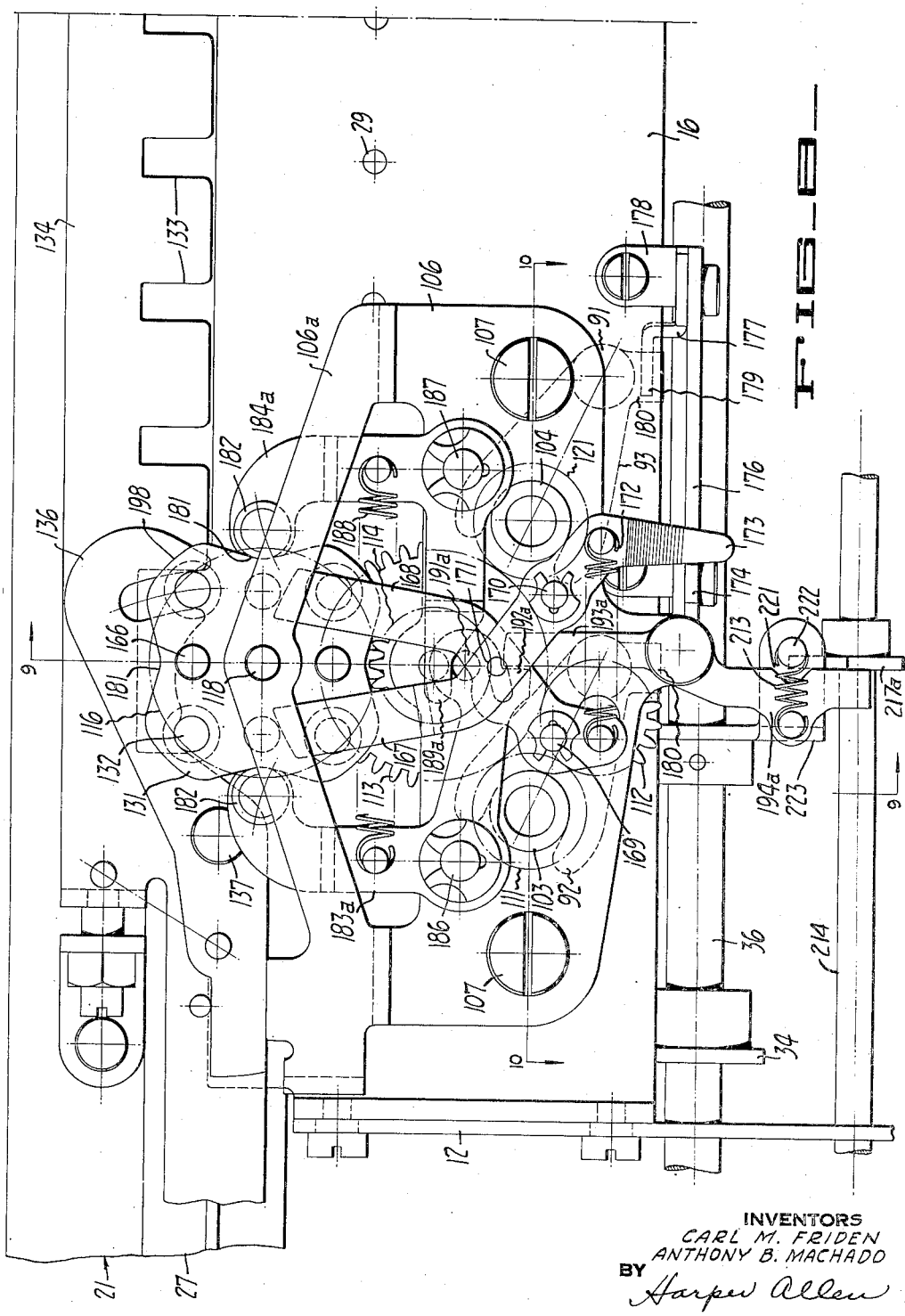

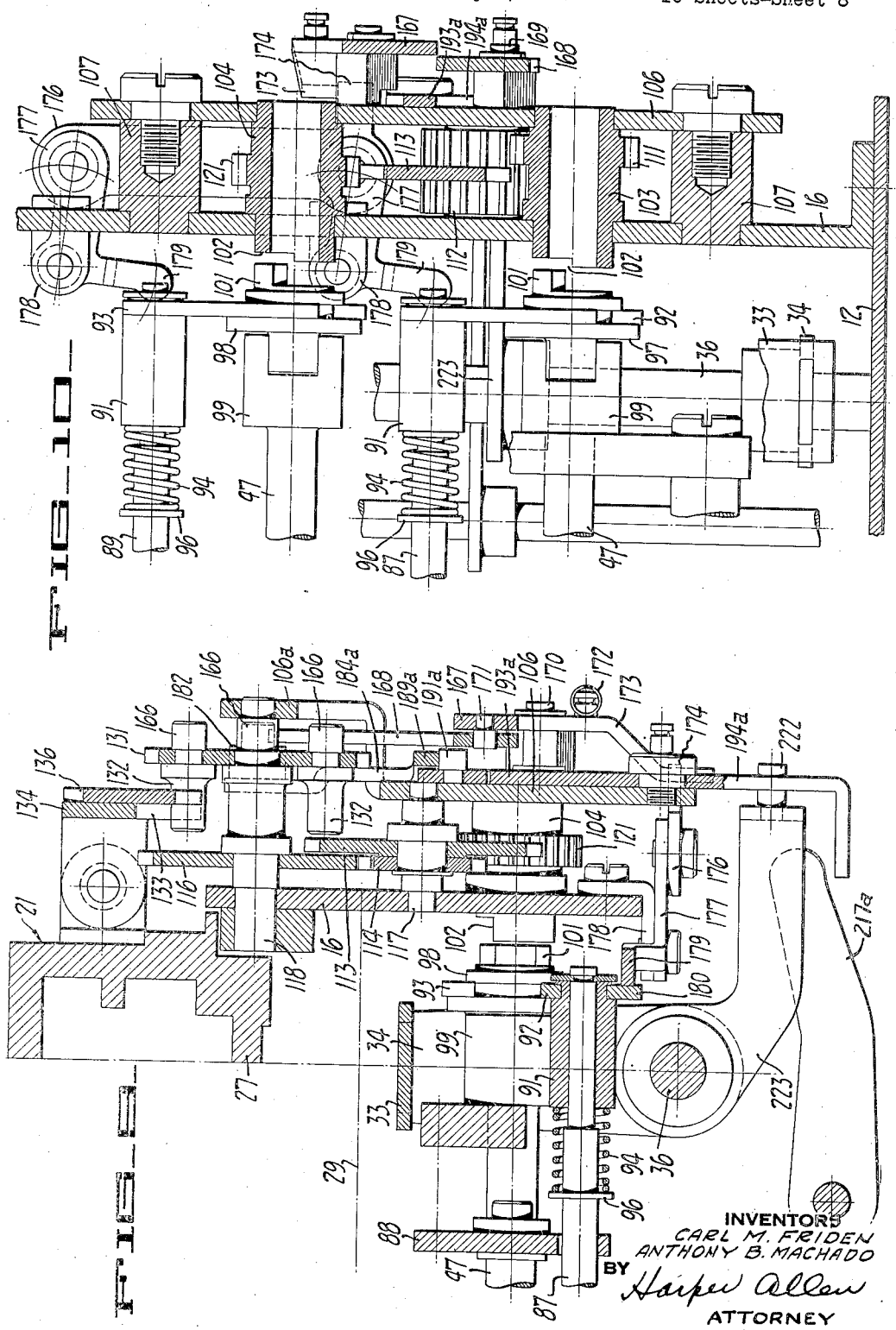

July 31, 1945.          C. M. FRIDEN ET AL          2,380,642
                         CENTRALIZING MECHANISM
                           Filed July 1, 1940         10 Sheets-Sheet 9
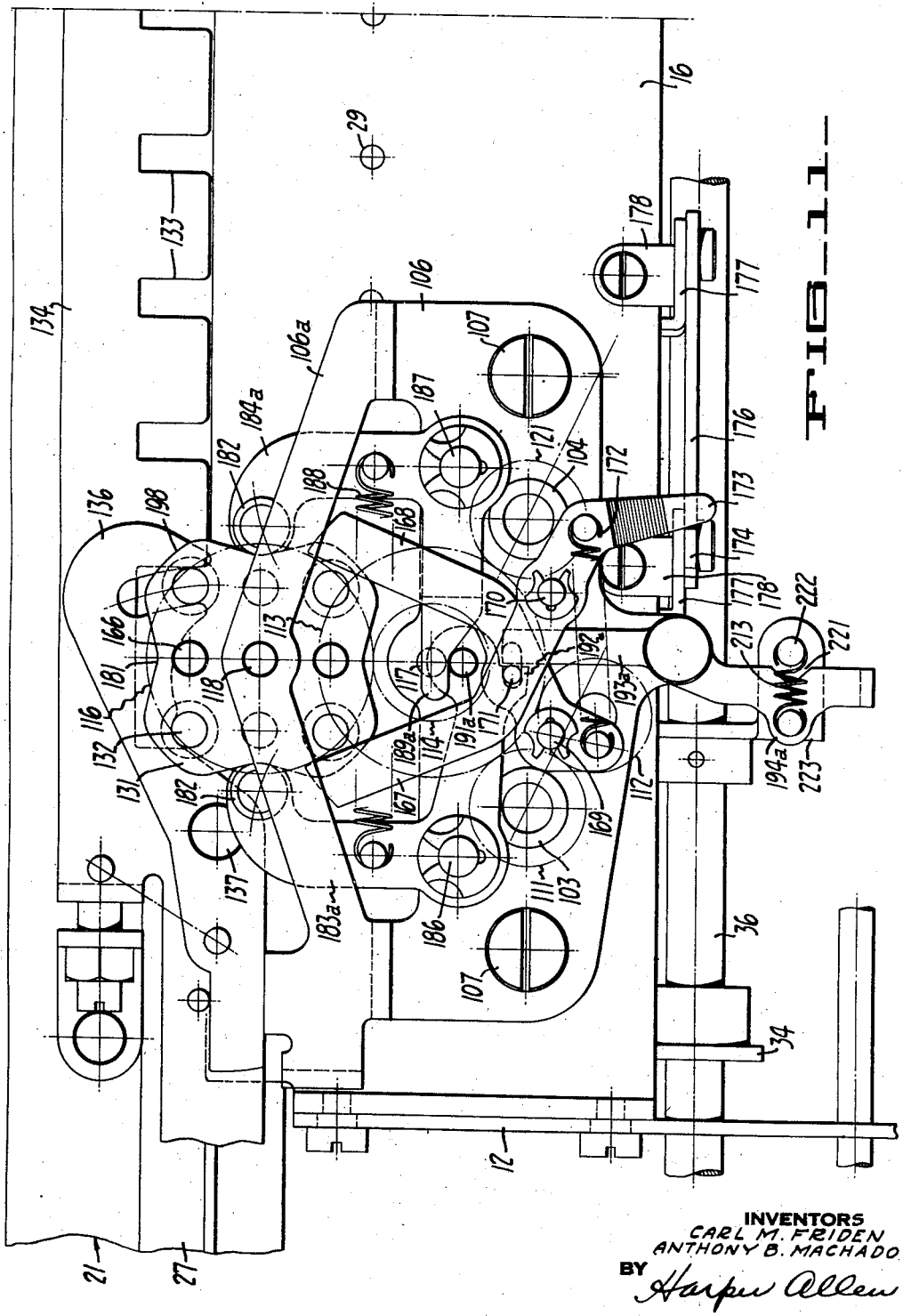
INVENTORS
CARL M. FRIDEN
ANTHONY B. MACHADO
BY Harper Allen
ATTORNEY

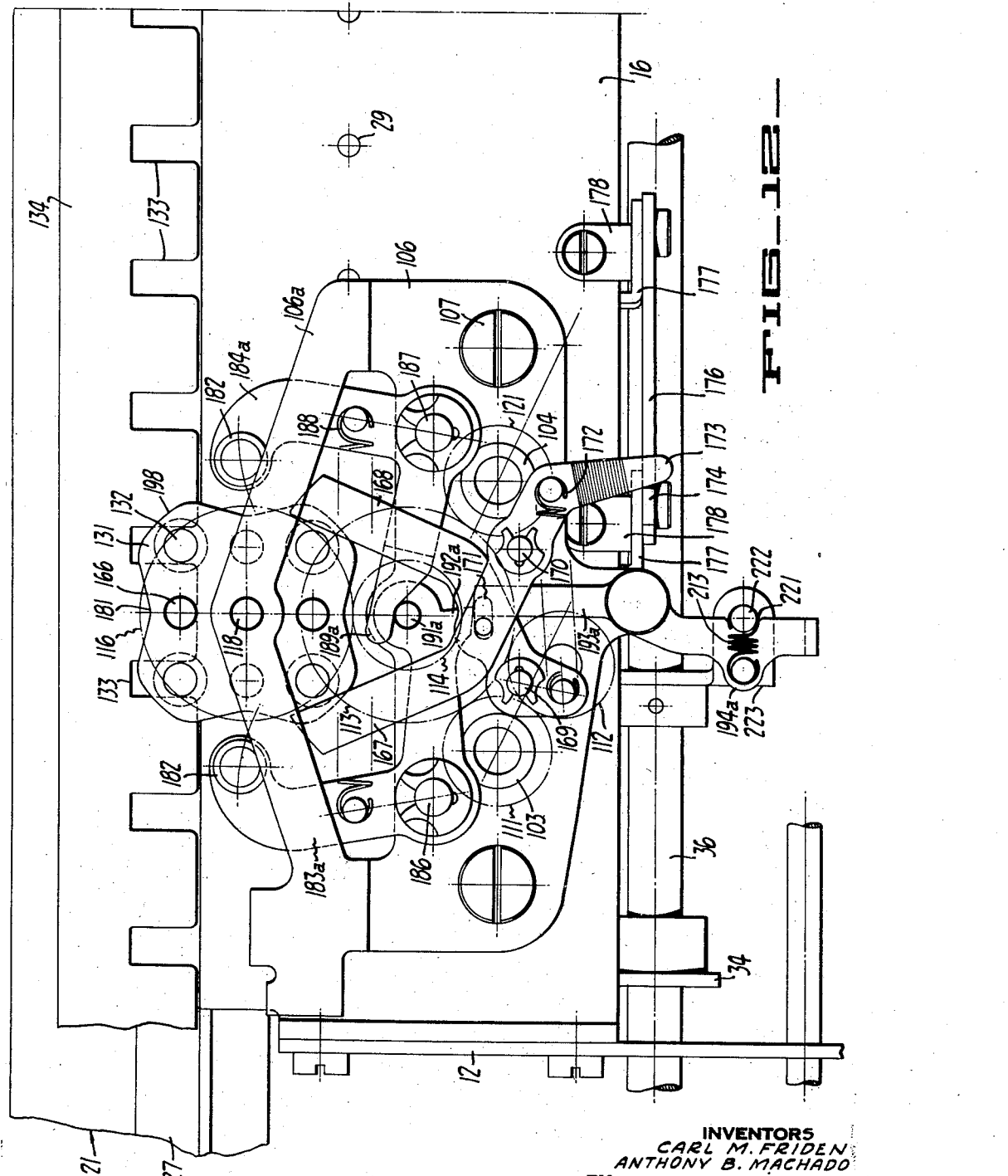

Patented July 31, 1945

2,380,642

UNITED STATES PATENT OFFICE 2,380,642

CENTRALIZING MECHANISM

Carl M. Friden, Pleasanton, and Anthony B. Machado, Oakland, Calif., assignors to Friden Calculating Machine Co., Inc., a corporation of California Application July 1, 1940, Serial No. 343,368

9 Claims. (Cl. 235—63)

This invention relates to calculating machines, and is concerned more particularly with a provision of improved means for effecting shifting movement of the shiftable register carriage of calculating machines.

It is a general object of the invention to provide an improved shift mechanism for the shiftable register carriage of calculating machines.

Another object of the invention is to provide a shift mechanism of a smooth and even action, and which is not subject to overthrow.

Another object of the invention is to provide an improved shifting mechanism of the character referred to, wherein the means for centralizing the shift mechanism in any ordinal position is rendered ineffective during plural order shifting operations.

Another object of the invention is to provide an improved shift mechanism of the character referred to wherein the disabling of the shift centralizer is performed automatically.

Other objects and advantages of the invention will be apparent from the following description of certain preferred embodiments thereof, as illustrated in the accompanying drawings, in which:

Figure 1 is a side elevational view partly in section of a calculating machine embodying the invention;

Figure 2 is a fragmentary sectional elevation illustrating certain of the shift control connections;

Figure 3 is a side elevational view partly in cross section showing a part of the shift control connections.

Figure 5 is an enlarged rear elevational view of a portion of Figure 4;

Figure 6 is a view similar to Figure 5 but showing the shift mechanism during operation. As shown, the parts are in half cycle position during a plural cycle shifting operation;

Figure 7 is a sectional plan view of the shift mechanism, the view being taken as indicated by the line 7—7 in Figure 5;

Figure 8 is an enlarged rear elevational view of a modified form of the invention;

Figure 9 is a cross sectional view taken along the line 9—9 of Figure 8.

Figure 10 is a cross sectional view taken along the line 10—10 in Figure 8.

Figure 11 is a view similar to Figure 8 but showing the parts as positioned before a shifting operation starts but with the shift key depressed;

Figure 12 is a view similar to Figure 8 but showing the parts as positioned during a shifting operation.

Figure 4:
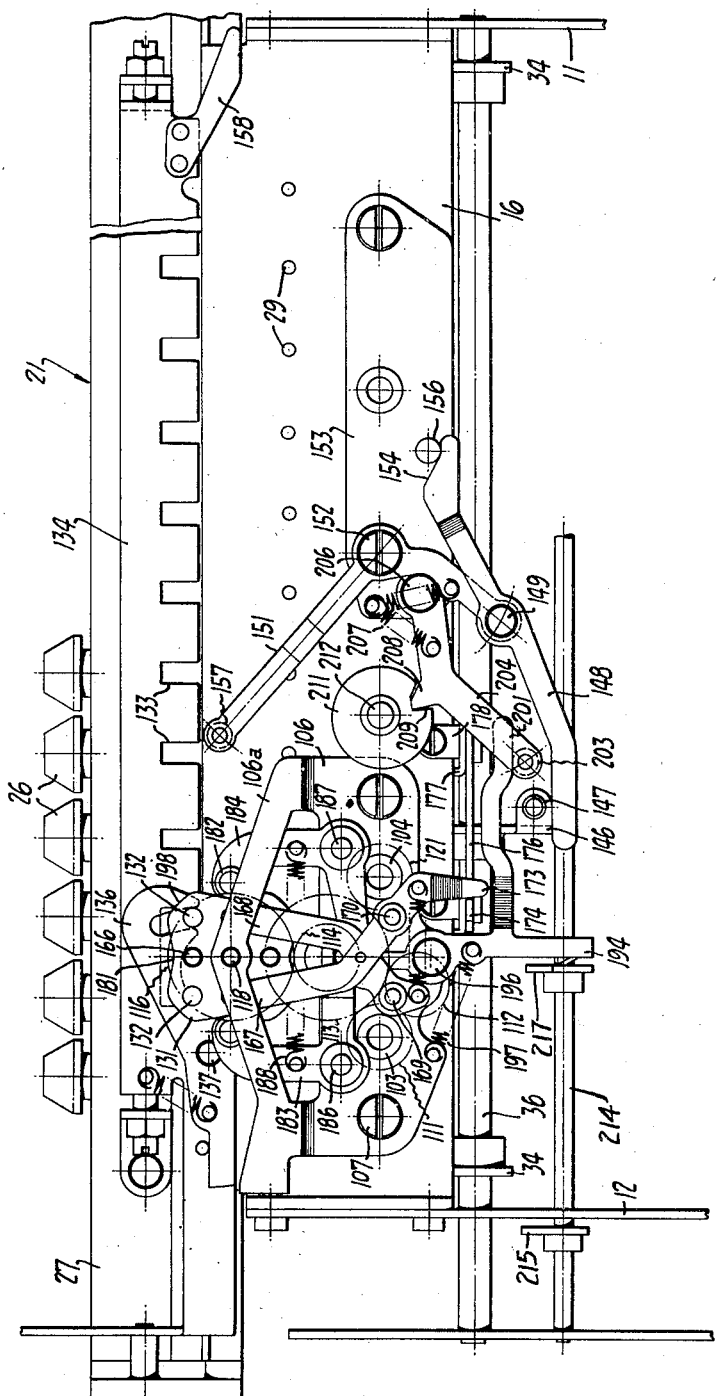
Figure 4 is a rear elevational view of the machine showing the shifting mechanism in cooperative relation with respect to the carriage.

Referring to Figures 1 to 4, the calculating machine selected for illustration in connection with the invention is of the general type described in the patent to Carl M. Friden, No. 2,229,889, dated January 28, 1941. The machine includes a base 10 upon which side plates 11 and 12 of the frame construction are mounted within the casing 13. The frame of the machine also includes transverse brackets 16, 17, 18 and 19 which extends between the side plates 11 and 12 and are secured thereto in any convenient manner.

The machine includes a shiftable register carriage 21 which is mounted for endwise sliding movement on frame brackets 16 and 19 by means of rollers 22. The register carriage 21 serves to mount the numeral wheels 23 of the revolutions counter having an actuator 24 of suitable construction associated therewith. The carriage 21 also mounts numeral wheels 26 of the accumulator which are suitably journaled in carriage frame 27 and adapted for actuation through suitable plus-minus gearing 28 having a sliding driving engagement with a shaft 29. Each shaft 29 receives differential increments of movement in a known manner from the associated actuating cylinder 31 under control of the usual bank of numeral keys 32 associated therewith. The sign character of the registration is controlled by shifting of the plus-minus gearing 28 under the control of a strap 33 which is mounted by suitable upright arms 34 on a transverse rockable shaft 36 which may be controlled in any convenient manner in performing calculating operations.

The drive for the actuating cylinders 31 and for all other power-driven power operations of the machine is derived from motor 41 having its drive shaft 42 connected by gearing 43 with the driving element or ratchet 44 of a cyclically operable clutch. Ratchet 44 is journaled on driven shaft 46 which is suitably connected to drive actuating shafts 47 on which the cylinders 31 are mounted. The cyclic operation of the clutch is controlled by means of clutch dog 48 carried by driven part 49 of the clutch and spring-urged by means of spring 51 to clutch-engaging position.

The engagement of the clutch is controlled by means of clutch control lever 52 pivoted at 53 on side plate 12. Control lever 52 is connected by link 54 with the pivoted lever 56 which is pivotally connected at its lower end with a second pivoted lever 57 which controls the opening and closing of motor circuit contacts 58.

*Shift mechanism.*—Means are provided for shifting the carriage selectively in either direction for one or more ordinal steps of movement, and the shifting means is preferably operated from the actuating shafts 47 and the cyclically operable clutch under the control of a pair of manually depressible, freely retractable shift keys which control shifting of the carriage for one or more steps of movement in accordance with the length of time (the number of machine cycles) which they are maintained depressed.

Referring to Figures 1 and 2, the shift control keys are indicated at 70 and 71 and are mounted for vertical sliding movement on side plates 12 by suitable pin and slot connections. Suitable spring means (not shown) may be provided for maintaining keys 70 and 71 in their raised positions as shown in Figure 1. As seen in Figure 1, each key 70 and 71 is provided with a pin 72 which projects to either side of the key. One end of each pin 72 cooperates with a suitable cam surface on a claw arm 73 secured to lever 56 for rocking movement therewith. Therefore, upon depression of either shift key 70 and 71, levers 56 and 57 are rocked to engage the clutch and close the motor circuit contacts 58.

Prior to the engagement of the clutch and closing of the motor contacts, each of keys 70 and 71 is operative to engage corresponding shift connections, so that selective shifting movement of the carriage 21 in either direction for one or more ordinal positions is determined by depression and release of the respective keys. As seen in Figure 2, the respective left-hand ends of pin 72 carried by the keys 70 and 71 are operatively related to arms 77 and 76, respectively, which are carried by sleeve 78 and shaft 79 on which sleeve 78 is pivotally mounted. As seen in Figure 2, sleeve 78 also carries a depending arm 81 having a pin 82 thereon on which a pusher link 83 is pivotally mounted. Spring 84 urges pusher link 83 in a clockwise direction to maintain its notched end 86 in operative engagement with push rod 87 which may be slidably mounted for endwise movement in the cross-brackets 17, 18 and 88 (Figures 2 and 7). Thus depression of the right shift key 70 through arm 77, sleeve 78 and arm 81 causes pusher link 83 to move the push rod 87 rearwardly. Depression of the left shift key 71 through the arm 76 rocks the shaft 79 which carries a depending arm similar to the arm 81 on which a spring-urged pusher link similar to the pusher link 83 is pivoted for engagement with a push rod 89 (Figure 7) which rod 89 is similar in all respects to push rod 87.

The respective push rods 87 and 89 upon depression of the respective keys 70 and 71 serve to enable respective drive connections from the actuating shaft to a shift drive gear in a manner to be described. As seen in Figures 5 and 7, each of the push rods 87 and 89 is telescopically engaged within a collar 91, the respective collars 91 being secured to respective forked arms 92 and 93. Springs 94 compressed between collars 91 and washers 96 on respective rods 87 and 89 maintain each telescopic push rod connection in extended position.

Forked arms 92 and 93 engage respective annular grooves in shiftable drive-establishing collars 97 and 98, which have endwise-slidable driving engagement with collars 99 secured on the rearward ends of adjacent actuating shafts 47.

Collars 97 and 98 (Figure 7) are provided with respective driving teeth 101 for engagement with opposed driving notches 102 in respective gear sleeves 103 and 104. Gear sleeves 103 and 104 are journaled in brackets 16 and plate 106 mounted on brackets 16 by means of suitable spacers and bolt connections 107.

As seen in Figures 1, 5, and 7, gear sleeve 103 carries gear 111 which meshes with wide idler gear 112 suitably journaled on bracket 16 and plate 106. Idler gear 112 also meshes with large gear 113 of a double gear assembly including a small gear 114 meshing with shift drive gear 116. The gear assembly 113 and 114 are carried by shaft 117 suitably journaled in brackets 16 and plate 106. Gear 116 is carried by shaft 118 suitably journaled in brackets 16 and in upward offset portion 106a (Figure 5) of plate 106.

As seen in Figure 7, gear sleeve 104 carries gear 121 which meshes directly with gear 113 of the double gear assembly. The result is that gear sleeves 103 and 104, when driven, serve to drive the gear train including gears 113, 114, and 116 in opposite directions. The gearing provides a drive ratio of four to one, so that each rotation of the gear sleeve 103 or gear sleeve 104 will provide a one-quarter rotation of gear 116.

As seen most clearly in Figures 1 and 5, shaft 118 which carries shift drive gear 116 also carries a drive plate 131 carrying four equally spaced shift drive pins 132 for engagement with notches 133 of shift rack 134 on carriage 21. As seen in Figure 4, yieldable pawl 136 pivoted at 137 on rack 134 provides one wall of one end slot 133, so that the disc 131 upon clockwise rotation, as shown in Figure 4, will be ineffective to shift the carriage past its end position but can become effective upon counter-clockwise movement to shift the carriage from its left-most position as viewed from the front of the machine.

The arrangement is such that depression of right shift key 70 operates through the associated linkage to engage drive tooth 101 with its corresponding notch 102 (Figure 7) of gear sleeve 103 to effect right-hand shifting of the carriage (i. e., to the left as shown in Figure 4) by causing counter-clockwise rotation of disc 131. Correspondingly, depression of left shift key 71 causes shifting of the carriage to the left as viewed from the front of the machine by engaging drive collar 98 Figure 7 with gear sleeve 104 to effect clockwise rotation of disc 131 as viewed in Figure 4.

Means are provided for disabling the control of the keys when the carriage shifts into either of its end positions, and for this purpose means is provided for lifting the yieldable pusher link 83 when the carriage reaches its right end position. As seen in Figure 3, lever 141 pivoted at 142 has an ear 143 underlying pusher link 83 and is pivotally and slidably connected at 144 with lever 146 pivoted on shaft 36. Lever 146 carries a roller 147 which overlies (Figure 4) an end of a lever 148 pivoted at 149 to the lower end of a lever 151 pivoted at 152 on a plate 153 carried by bracket 16. Lever 148 has a cam surface 154 normally abutting a pin 156 on plate 153. The upper arm of lever 151 carries a roller 157 which is adapted for engagement by arm 158 mounted on rack 134 when the carriage is shifted into its right end position (its leftmost position as viewed in Figure 4) to rock lever 151 in a counter-clockwise direction and thereby move lever 148 to the right as viewed in Figure 4, whereby pin 156 operates on cam surface 154 to rock lever 148 in a clockwise direction and operate the lever 146. The lever 146 is moved in a counter-clockwise direction as viewed in Figure 3 to oscillate lever 141 in a clockwise direction and thereby lift pusher link 83 against the tension of its spring 84 and move it out of engagement with push rod 87 which is then retracted by the spring (not shown) that is usually provided between the frame 18 and the push rod 87 to urge the push rod forwardly to disengage the drive connection between collar 97 and gear sleeve 103.

In a similar manner, the left shift clutch may be disengaged upon arrival of the carriage in the left end position by utilizing the action of the pawl 136 (Figure 4), a suitable linkage for which purpose is disclosed in the patent to Friden No. 2,352,376 and described therein at page 5, col. 1, lines 5 to 30.

Means are provided for locking the carriage in any shifted position thereof, said means being releasable upon operation of either shift key. As best seen in Figures 5 and 6, the shift disc 131 carries four pins 166 equally spaced thereabout for cooperation with the upper ends of a pair of scissor levers 167 and 168 pivoted at 170 and 169 respectively on plate 106 and having a pin and slot connection 171. Stop arms 167 and 168 are urged together into operative relation with respect to pins 166 by spring 172 tensioned between the lower ends thereof. Stop arm 167 carries a depending arm 173 which lies in front of an ear 174 (Figures 5 and 7) of a link 176 pivotally connected to similar bell cranks 177 which are pivoted on vertical axes on respective brackets 178. Each bell crank 177 has an arm 179 lying in front of a depending tab 180 of respective push forks 92 and 93 and together with the link 176 form a parallel linkage which, upon operation of either of push rods 87 and 89, is operated to rock the stop arms 167 and 168 to disengaged position, as shown in Figure 6, for example.

The shift drive disc 131 has centralizing means associated therewith which operate to insure accurate positioning of the carriage in any shifted position thereof and which are controlled to be disabled during plural cycle operation of the shifting mechanism until the carriage is in the desired shifted position. As seen in Figure 5, the shift disc 131 is provided with four equally spaced centralizing depressions 181 which are in equally spaced-apart relation between the pins 132. Opposite depressions 181 are engaged by respective rollers 182 journaled at the upper ends of respective centralizing bell cranks 183 and 184 pivoted at 186 and 187 respectively on plate 106. The upper arms of centralizing bell cranks 183 and 184 are connected by tension spring 188 which serves to urge rollers 182 into centralizing engagement with the depressions 181 of the disc 131.

The lower arms of respective bell cranks 183 and 184 extend into overlapping relation, and are connected so that the centralizing bell cranks move together. As seen in Figure 5, bell crank 183 is provided with reduced portion 189 on its lower arm which overlies the pin 191 carried by bell crank 184. Bell crank 184 on its lower arm carries a downwardly extending ear 192 which, in the centralizing position of bell cranks 183 and 184, is positioned alongside the upper end 193 of a latch lever 194 which is pivoted at 196 on plate 106. Lever 194 is urged in a clockwise direction, as viewed in Figure 5, by spring 197 secured thereto and to plate 106.

From the foregoing description, it will be seen that upon rotation of plate 131 the rollers 182 are lifted from depressions 181 of the cam disc 131 to raise portions 198 thereof, as shown in Figure 6, for example, when the lower arms of the bell cranks have been lifted to allow latch end 193 to snap under ear 192 to maintain the bell cranks 183 and 184 in non-centralizing position where they will not engage the cam disc 131 during rotation thereof.

Automatically operable means are provided for maintaining the latch 194 active during plural cycle operation of the shifting mechanism and for disabling the latch upon completion of the desired shifting operation. For this purpose, the lever 194 is provided with an arm 201 which overlies a roller 203 carried by a cam follower arm 204 pivoted at 206 on plate 153 and urged in a clockwise direction by spring 207. Cam follower arm 204 is provided with a tooth 208 which is adapted in the full-cycle position of the parts to seat in a notch 209 of a cam disc 211 secured on the extended end 212 of one of actuating shafts 47. Disc 211 is adapted to rotate in a clockwise direction, as viewed in Figure 5, and in the trailing side of its notch 209 is provided with a cam face cooperating with the cam face of tooth 208 to lower the arm 204 and allow latch lever 194 to move into latching engagement with tooth 192.

Thus latch lever 194 moves into latching engagement with the bell cranks 183 and 184 when they are engaged with high portions 198 of disc 131. It will be noted that the contour of cam disc 211 is slightly spiralled to provide a higher radial depth at point $a$ on one side of the cam notch 209 with respect to point $b$ at the other side thereof, the action being such that upon continuous rotation of cam disc 211 during a plural cycle operation, the cam follower arm 204 does not have sufficient time to fall into the notch 209. Thus while a plural cycle shifting operation is in progress, the centralizing bell cranks 183 and 184 are maintained in the displaced position shown in Figure 6, so that their action on the disc 131 is avoided. This results in a smooth, even shifting operation and in a substantial reduction of noise of operation which would occur if the centralizing rollers 182 were allowed to follow the periphery of the disc 131 at all times. Thus the only time that the rollers 182 follow the periphery of the disc 131 is during a single step shifting operation.

Preferably, means is provided to prevent operation of the centralizer latching means during division operation to enable functioning of the centralizing bell cranks irrespective of the continuous cycle operation of the actuating means in performing division. Referring to Figures 1, 4, 5, shaft 214 of a conventional form of division mechanism as shown in said Patent No. 2,229,889 is settable in a clockwise direction through arm 215 and pin 216 of the division setting mechanism. Shaft 214 carries an arm 217 having its end normally above and out of the path of an extension 218 of latch lever 194. Upon setting of shaft 214 during division arm 217 moves into blocking relation with respect to extension 218 of latching lever 194 to block operative movement thereof during division.

Figures 8 to 12 inclusive illustrate a modified form of the invention wherein similar parts are numbered as in Figures 1 to 7 and wherein modified parts are supplied with the suffix $a$. In this modification, the control for delatching the centralizing bell cranks is exerted from the means for determining plus or minus registration on the numeral wheels. Referring to Figures 8, 9 and 10, the shift disc 131 is shown with its shift pins 132 for operating the carriage shift rack 134 in the usual manner through the gearing 113, 114, etc., from respective actuating shafts 47 under the control of respective shift forks 92 and 93. Pins 166 on the disc 131 cooperate with stop arms 167 and 168 in the same manner, and the movement of the stop arms to and from active position is under control of the parallel linkage 176, 177 and the forks 92 and 93 in the same manner.

The centralizing bell cranks 183a and 184a are modified slightly from the previous construction in that the bell crank 183a is provided with the depending ear 192a while bell crank 184a has the reduced end 189a overlying pin 191a.

Ear 192a is adapted to cooperate with latching end 193a of latching lever 194a which is urged in a counter-clockwise direction by spring 213. The lower end of latch lever 194a is provided with V-shaped notch 221 for cooperation with a pin 222 carried at the end of an arm 223 secured on shaft 36. When the shifting mechanism is not in operation, pin 222 is centered with respect to the notch 221 and is spaced therefrom an amount to permit rocking of latch lever 193a from inactive position (Figure 8) to active position (Figure 12).

It will be recalled that shaft 36 is rocked in one or the other direction from its normal position shown in Figure 1 whenever positive or negative registration on the numeral wheels is determined by setting of the plus-minus gear assembly 28. Therefore, with the parts shown as positioned in Figure 8, the plus-minus gear assembly is in its central neutral position and a shifting operation can occur.

Figure 11 shows the position of the parts when a shift key is first depressed to release the stop arms 167 and 168 to allow the shifting operation, but before the shifting operation has started. Figure 12 shows the position of the parts during a plural shifting operation when the centralizing bell cranks 183a and 184a are maintained disabled by the latch lever 194a, and pin 222 is seated in notch 221. Upon the conclusion of a shifting operation the centralizing bell cranks 183a and 184a are maintained in disabled position by latching lever 194a until the beginning of a registration, when the rocking of shaft 36 will become operative through the arm 223 and pin 222 to rock latch lever 194a from the position shown in Figure 12. The movement of lever 194a serves to release centralizing bell cranks 183a and 184a for return into engagement with the shift disc 131 to centralize the carriage in its original position before beginning of the registration and before actual meshing of the plus-minus gears 28 with the corresponding gears of the register.

In operation of the modification disclosed in Figures 8 through 12, the parts are initially positioned as shown in Figure 8. When the operator first depresses a shift key and before beginning of the drive, the depression of the key moves one of the shift forks 92 or 93 and operates through the parallel linkage 176, 177 to rock the stop arms 167, 168 from the position shown in Figure 8 to that shown in Figure 11. This operation occurs before the engagement of the drive connection for the selected shift drive. Subsequently, upon engagement of the clutch and closing of the motor circuits the shift disc 131 begins to turn and the rollers 182 of the centralizing bell cranks 183a and 184a ride out of the depressions 181 of the cam disc and onto the high points thereof. This oscillation of the centralizing bell cranks 183a and 184a allows the latch lever 193a to move into latching position as shown in Figure 12 so that during subsequent shifting operation the centralizing bell cranks 183a and 184a are held in their inactive positions.

The disengagement of the centralizing bell cranks is maintained until the beginning of the next subsequent registering operation when oscillation of the shaft 36 in setting the plus-minus gears will operate through arm 223 and pin 222 to move the latching lever 193a to the inactive position shown in Figure 8 when the centralizing bell cranks 183a and 184a are free to move into engagement with opposite depressions 181 of the cam disc 131, and thereby accurately center the register carriage with respect to the actuating means before actual registering operation commences.

We claim:

1. In a calculating machine having a cyclically operable mechanism and means for centralizing said mechanism a latch lever for holding said centralizing means in inactive position, means for controlling the movement of said lever from active position including a notched cam disc and an arm having a nose for seating in the notch of said cam disc in the full cycle position thereof, and means for driving said notched cam disc in cyclic fashion in time with the operation of said mechanism.

2. In a calculating machine having a cyclically operable mechanism, means for centralizing said mechanism, a latch lever for holding said centralizing means in inactive position, a spring urging said latch lever to active position, means for controlling the movement of said lever from active position including a notched cam disc and an arm having a nose for seating in the notch of said cam disc in the full cycle position thereof, a second spring stronger than said first spring urging said arm against said disc, and means for driving said notched cam disc in cyclic fashion in time with the operation of said mechanism.

3. In a calculating machine having a shiftable carriage, numeral wheels in said carriage, and actuating means for said numeral wheels; means for shifting said carriage selectively in either direction from one ordinal position to another in response to manual control of said shifting mechanism, means for centralizing said shift mechanism and said carriage in a selected ordinal position thereof, means for latching said centralizing means in inactive position during a plural cycle shifting operation, a member movable upon setting the machine for a registering operation, and means controlled by said member upon movement thereof for rendering said latching means ineffective.

4. In a calculating machine having a shiftable carriage, numeral wheels in said carriage, and actuating means for said numeral wheels; means for shifting said carriage selectively in either direction from one ordinal position to another, means for centralizing said shift mechanism and said carriage in a selected ordinal position thereof, means for latching said centralizing means in inactive position during a plural cycle shifting operation, means settable as an incident to initiation of a calculating operation, and means controlled by said settable means for disabling said latching means.

5. In a calculating machine having a cyclically operable mechanism, means for driving said mechanism, means for centralizing said mechanism in a selected position, means for latching said centralizing means in inactive position during a plural cycle operation, and means automatically controlled by said driving means for permitting operation of said latching means during the time said driving means is active, said last named means including a notched cam disc connected to said driving means and a cam follower member having a projection for seating in the notch of said disc in the full cycle position thereof.

6. In a calculating machine having a cyclically operable mechanism, means for driving said mechanism, means for centralizing said mechanism in a selected position, means for latching said centralizing means in inactive position during a plural cycle operation, and means automatically controlled by said driving means for permitting operation of said latching means during the time said driving means is active, said last named means including a notched cam disc connected to said driving means and a cam follower member having a projection for seating in the notch of said disc in the full cycle position thereof, the width of the notch of said cam being so proportioned and related to the circumference of said disc and the speed of said driving means to prevent substantial entering of said notch by said projection with the disc rotating.

7. In a calculating machine having a cyclically operable mechanism, means for driving said mechanism, means for centralizing said mechanism in a selected position, means for latching said centralizing means in inactive position during a plural cycle operation, and means automatically controlled by said driving means for permitting operation of said latching means during the time said driving means is active, said last named means including a notched cam disc connected to said driving means and a cam follower member having a projection for seating in the notch of said disc in the full cycle position thereof, the trailing edge of the notch of said disc and the cooperating face of said projection providing cooperating cam surfaces tending to lift said projection from the notch.

8. In a calculating machine having a shiftable carriage, means for shifting said carriage including a rotatable element, and cyclically operable means for driving said shifting means: a carriage centralizer comprising a cam on said rotatable element and a lever spring-urged toward said cam, means for disabling said centralizer comprising a latch adapted to latch said lever in inoperative position upon movement of said lever to said position by said cam on said rotatable element, and means for enabling said centralizer at the conclusion of operation of said shifting means comprising means for tripping said latch and means operated in timed relationship with said cyclically operable driving means for restraining said tripping means until the operation of said shifting means is concluded.

9. In a calculating machine having a shiftable carriage, means for shifting said carriage including a rotatable element, means for driving said shifting means from a source of power, a clutch for controlling operation of said driving means, means for disengaging said clutch and invariably stopping the driven member thereof in full-cycle position: a carriage centralizer comprising a cam on said rotatable element and a lever spring-urged toward said cam, means for disabling said centralizer upon engagement of said clutch comprising a latch adapted to latch said lever in inoperative position upon movement of said lever to said position by said cam on said rotatable element, and means for enabling said centralizer upon disengagement of said clutch comprising means for tripping said latch, a second cam, means for rotating asid second cam in synchronism with said driven member of said clutch, said second cam restraining said tripping means during operation of said clutch and releasing said tripping means upon stopping of said driven member of said clutch in said full-cycle position.

CARL M. FRIDEN.
ANTHONY B. MACHADO.